United States Patent [19]

Gross

[11] 4,325,814
[45] Apr. 20, 1982

[54] CATALYTIC CRACKING PROCESS UTILIZING A COPPER CHROMITE OXIDATION CATALYST

[75] Inventor: Benjamin Gross, Cherry Hill, N.J.

[73] Assignee: Mobil Oil Corporation, New York, N.Y.

[21] Appl. No.: 197,252

[22] Filed: Oct. 15, 1980

Related U.S. Application Data

[63] Continuation of Ser. No. 47,503, Jun. 11, 1979, abandoned, which is a continuation-in-part of Ser. No. 866,072, Dec. 30, 1977, abandoned, which is a continuation-in-part of Ser. No. 511,151, Oct. 2, 1974, abandoned.

[51] Int. Cl.$^3$ .................. C10G 11/05; C10G 11/18; B01J 29/38; B01J 21/20
[52] U.S. Cl. .................. 208/120; 208/113; 252/416; 252/417; 252/418; 252/455.2; 252/465
[58] Field of Search ............... 252/417, 419, 416, 418; 208/113, 120

[56] References Cited

U.S. PATENT DOCUMENTS

| | | | |
|---|---|---|---|
| 2,436,927 | 3/1948 | Kassel | 252/417 |
| 3,364,136 | 1/1968 | Chem et al. | 208/120 |
| 3,808,121 | 4/1974 | Wilson, Jr. | 252/419 |
| 3,894,934 | 7/1975 | Owen et al. | 252/417 |

*Primary Examiner*—P. E. Konopka
*Attorney, Agent, or Firm*—Charles A. Huggett; Michael G. Gilman; Charles J. Speciale

[57] ABSTRACT

A process is disclosed for enhancing the conversion of carbon monoxide within the regenerator of a cracking unit used to regenerate spent catalysts from the catalytic cracking of gas oil by the addition of controlled amounts of either copper chromite, cobalt chromite, or mixtures thereof. Conversion of carbon monoxide in the regenerator is accomplished while maintaining the efficiency of the cracking reaction at high levels.

3 Claims, No Drawings

CATALYTIC CRACKING PROCESS UTILIZING A COPPER CHROMITE OXIDATION CATALYST

CROSS REFERENCE TO RELATED CASES

This is a continuation of application Ser. No. 047,503 filed June 11, 1979 now abandoned, which is a continuation-in-part of Ser. No. 866,072, filed Dec. 30, 1977 now abandoned; which, in turn, is a continuation-in-part of Ser. No. 511,151, filed Oct. 2, 1974 and now abandoned.

BACKGROUND OF THE INVENTION

This invention is primarily concerned with the catalytic cracking of gas oils to produce hydrocarbons of lower molecular weight, such as gasolines, jet fuels, diesel oils, etc. Catalytic cracking of gas oils inherently results in the deposition of significant amounts of a carbonaceous material generally referred to as coke on the catalyst, thereby resulting in a decline of activity of said catalyst which must be compensated for by frequent regeneration of the same by burning off said coke at elevated temperatures in a regenerator. The art is well aware that among the products resulting from the combustion of coke are carbon monoxide and carbon dioxide. The art is also aware that combustion of the carbon monoxide to carbon dioxide generates more heat which, in turn, may be able to be absorbed by the catalyst being regenerated and introduced back into the cracking reaction. This is particularly important since a cracking reaction is endothermic, whereas a regeneration reaction is exothermic. The art is also aware that enhancing the CO oxidation in the regenerator can also have benefits with regard to the fact that the catalyst being regenerated can have its residual coke reduced to such a low level that its activity and selectivity for the catalytic cracking of gas oil becomes considerably enhanced. The art is also well aware of the so-called afterburning phenomenon wherein too high a concentration of carbon monoxide in the regenerator can cause excessive temperatures which can lead to potential damage of both catalyst and equipment. Prior art workers approached the problem of controlling afterburning in a number of ways which can be broadly classified as catalytic techniques and non-catalytic techniques. As examples of non-catalytic techniques of controlling afterburning, one can include such common prior art procedures as utilizing steam injection in order to limit temperature or limiting the amount of carbon monoxide in contact with oxygen such that oxidation of carbon monoxide to carbon dioxide could not take place. Catalytic ways of controlling afterburning include the addition of materials known to have catalytic activity for the oxidation of carbon monoxide to carbon dioxide. One of the earliest materials utilized was chromium oxide and, in fact, a commercial catalyst utilizing chromium oxide to control afterburning was developed and is disclosed in U.S. Pat. No. 2,647,860. However, catalysts useful for the oxidation of carbon monoxide to carbon dioxide are also hydrogenation/dehydrogenation catalysts and, as is well known in the art, it is not desirable to have a hydrogenation/dehydrogenation catalyst in a non-hydrogenative cracking process since these materials usually promote the dehydrogenation of gas oil which leads to excessive coke and hydrogen formation. Thus, until quite recently, the prior art catalysts represented a compromise between the oxidation function which was desirable in order to enhance the conversion of carbon monoxide to carbon dioxide and the hydrogenation/dehydrogenation function which was undesirable.

A dramatic breakthrough in this general area has recently been made and it involves the use of trace amounts of certain Group VIII metals or rhenium. Quite unexpectedly, it was discovered that these Group VIII metals could be used in such low quantities such that they would have a tremendous activity for the oxidation of carbon monoxide, yet they would have substantially little dehydrogenation activity so as not to seriously affect the cracking reaction.

U.S. Pat. Nos. 4,072,600; 4,088,568; and 4,093,535 are patents which disclose and claim the above concept.

SUMMARY OF THE INVENTION

It has now been found that copper chromite, cobalt chromite or a mixture of the two permit an effective control of carbon monoxide from the effluent gas of the regenerator while still maintaining excellent gasoline yield without excessive coke and hydrogen make.

Thus, quite simply put, the instant applicant has discovered that cobalt chromite and copper chromite can function in almost the same manner as the recently discovered platinum type catalysts since they possess an extraordinarily high activity in connection with CO oxidation activity and yet can be used in such small amounts that their dehydrogenation activity is substantially minimized such that gasoline yield is maintained without excessive coke and hydrogen make. Although copper chromite and cobalt chromite are not as active as the platinum group metals, nevertheless, they do provide an alternative to the use of these materials. Additionally, these catalysts have activities orders of magnitude higher than their individual components. Thus, for example, a copper chromite catalyst has activity with regard to CO oxidation which is orders of magnitude higher than either copper oxide or chromium oxide. It is surprising that these very active catalysts can be used in such minute amounts such that they will retain their oxidation activity and yet their hydrogenation/dehydrogenation activity can be suppressed so as to not seriously affect the cracking reaction. The use of copper chromite, cobalt chromite or mixtures thereof provides flexibility with regard to controlling CO emissions to the atmosphere which is mandated by various Federal and State environmental regulations. Additionally, the use of these catalysts can provide greater flexibility with regard to heat which is capable of being recovered in a regeneration process in connection with controlling the cracking reaction. The broad concept of adding copper chromite to the catalyst inventory of a cracking unit is old in the art and is disclosed in U.S. Pat. No. 3,926,778. However, the lowest amount of oxidation catalyst which can be added in accordance with the teachings of this patent is 1/10th weight percent, i.e. 1,000 ppm. The novel process of this invention is concerned with adding substantially less chromite to the total catalyst inventory, i.e. no more than 500 ppm and more preferably about 50–150 ppm. It has been discovered that unless the copper chromite concentration in the circulating catalyst inventory of a cracking unit is limited to no more than 500 ppm that unacceptable gas make will occur. It is noted that concentrations of from 1–50 ppm are also desirable, particularly at high regenerator temperatures.

DESCRIPTION OF THE PREFERRED EMBODIMENTS

As has heretofore been stated, the novel process of this invention resides in the addition of copper chromite, cobalt chromite, or a mixture of the two to the circulating catalyst inventory of a catalytic cracker in amounts such that the conversion of carbon monoxide to carbon dioxide will be considerably enhanced and yet cracking reaction will be substantially unaffected.

Two major variants for endothermically cracking hydrocarbons are fluid catalytic cracking (FCC) and moving Led catalytic cracking. In both of these processes as commercially practiced, the feed hydrocarbon and the catalyst are passed through a "reactor"; are disengaged; the catalyst is regenerated with cocurrent and/or countercurrent air; and the regenerated reflexively heated catalyst recontacted with more feed to start the cycle again. These two processes differ substantially in the size of the catalyst particles utilized in each and also in the engineering of materials contact and transfer which is at least partially a function of the catalyst size.

In fluid catalytic cracking (FCC), the catalyst is a fine powder of about 10 to 200 microns, preferably about 70 micron, size. This fine powder is generally propelled upwardly through a riser reaction zone suspended in and thoroughly mixed with hydrocarbon feed. The coked catalyst particles are separated from the cracked hydrocarbon products, and after purging are transferred into the regenerator where coke is burned to reactivate the catalyst. Regenerated catalyst generally flows downward from the regenerator to the base of the riser.

One typical example of industrially practiced moving bed hydrocarbon catalytic cracking is known as thermofor catalytic cracking (TCC). In this process the catalyst is in the shape of beads or pellets having an average particle size of about one-sixty-fourth to one-fourth inch, preferably about one-eighth inch. Active, hot catalyst beads progress downwardly cocurrent with a hydrocarbon charge stock through a cracking reaction zone. In this zone hydrocarbon feed is endothermically cracked to lower molecular weight hydrocarbons while coke is deposited on the catalyst. At the lower end of the reaction zone the hydrocarbon products are separated from the coked catalyst, and recovered. The coked catalyst is then passed downwardly to a regeneration zone, into which air is fed such that part of the air passes upwardly countercurrent to the coked catalyst and part of the air passes downwardly cocurrent with partially regenerated catalyst. Two flue gases comprising carbon oxides are produced. Regenerated catalyst is disengaged from the flue gas and is then lifted, pneumatically or mechanically, back up to the top of the reaction zone.

The catalysts used in endothermic catalytic nonhydrogenative cracking are to be distinguished from catalysts used in exothermic catalytic hydrocracking. Operating conditions also to be distinguished. While the catalytic cracking processes to which this invention is directed operate at low pressures near atmospheric and in the absence of added hydrogen, hydrocracking is operated with added hydrogen at high pressures of up to about 1000 to 3000 psig. Further, non-hydrogenative catalytic cracking is a reflexive process with catalyst cycling between cracking and regeneration (coke burn off) over a very short period of time, seconds or minutes. In hydrocracking, on the other hand, the catalyst remains in cracking service for an extended period of time, months, between regeneration (coke burn off). Another important difference is in the product. Nonhydrogenative catalytic cracking produces a highly unsaturated product with substantial quantities of olefins and aromatics, and a high octane gasoline fraction. Hydrocracking, in contrast produces an essentially olefin-free product with a relatively low octane gasoline.

This invention is not directed to hydrocracking nor is it within the scope of this invention to use hydrocracking catalysts in the process hereof. Hydrocracking catalysts have an acidic cracking component, which may be a crystalline aluminosilicate zeolite, amorphous silica alumina, clays or the like, and a very strong hydrogenation/dehydrogenation component. Strong hydrogenation/dehydrogenation components are illustrated by metals such as molybdenum, chromium and vanadium, and Group VIII metals such as cobalt, nickel and palladium. These are used in relatively large proportion, certainly large enough to support heavy hydrogenation of the charge stock under the conditions of hydrocracking. To the contrary, strong hydrogenation/dehydrogenation metals are neither required nor desired as components of non-hydrogenative catalytic cracking. In fact, it is usual for some metals, such as nickel and vanadium, to deposit out on the catalyst from the charge stock during nonhydrogenative cracking. These are considered to be catalyst poisons in this process and therefore to be avoided or at least minimized. Their detrimental effect in nonhydrogenative catalytic cracking is to increase the coke and light gas, including hydrogen, produced in the cracking reaction and therefore to reduce the yield of desired liquid products, particularly gasoline.

The catalysts which can be used in the catalytic cracking of gas oil are well known in the art and include catalysts containing silica, alumina, magnesia, zirconia, clay and combinations thereof. Particularly preferred cracking catalysts are composites of an active crystalline aluminosilicate zeolite having a pore size greater than about 6 Angstrom units in a porous matrix such as a clay-derived matrix. Other types of matrices include silica-alumina, magnesia, zirconia, and mixtures thereof. Catalysts of these types are known in the art and are disclosed in U.S. Pat. Nos. 3,140,249; 3,140,251; 3,140,252; and 3,140,253; the disclosure of said patents being incorporated by reference. Particularly important as cracking catalysts are rare earth exchanged zeolite Y in a clay matrix having a sodium content of which is less than about 1 weight percent.

It is to be understood that the particular method of adding copper chromite, cobalt chromite, or mixtures thereof to the circulating catalyst inventory is not critical and, in fact, it can be performed in a number of different ways. The copper and cobalt chromite may be a component of all of the catalyst particles or only some of the catalyst particles. In terms of its concentrations in the entire system, it must be present in a large enough proportion to be able to effect the reaction of carbon monoxide with oxygen to carbon dioxide provided the conditions in the regenerator are otherwise sufficient to support this combustion, i.e. sufficiently high temperature and sufficient air. Yet it must not be present in a proportion so large that it substantially adversely affects the operation of the cracking side of the process. In this regard, it is important to note that in some instances it may be desirable to cause substantially all of the carbon burned in the regenerator to be oxidized all the way to carbon monoxide. In other instances, it may be desirable to cause only part of the carbon to be oxidized all the way to carbon dioxide and permit some substantial amount to be only partially oxidized to carbon monoxide. The use of the instant catalyst now permits the refiner to select the exact amount of heat to be generated in the regenerator as a function of efficient carbon monoxide burning. Because of the inherent advantages stemming from the use of the novel process of this invention, the refiner is able to increase the regenerator temperature by burning some of the carbon monoxide therein, burning the rest outside the regenerator; for example, in a steam generating CO boiler. Quite obviously, the preferred embodiments of this invention reside in burning all of the carbon monoxide within the regenerator since this obviates the need of a CO boiler which may be necessary in order to meet the various governmental environmental regulations concerning CO emission to the atmosphere. As has previously been set forth, increasing the temperature in the regenerator reduces the residual coke of regenerated catalyst and increases the activity of the regenerated catalyst which is an added advantage in a cracking operation.

A convenient method of adding copper or cobalt chromite to the circulating catalyst inventory of a cracking unit is to form a mixture of copper chromite or cobalt chromite with an inorganic oxide such as alumina and to add the alumina containing the copper chromite or cobalt chromite or mixtures thereof either to the cracking catalyst per se or any component thereof prior to introduction of the same into the cracking unit. Another method of adding the oxidation catalyst to the cracking unit would be to introduce the alumina-containing cobalt chromite or copper chromite directly into a cracking unit which already contains cracking catalysts, said introduction being accomplished either by adding it to the regenerator or to the cracking unit. It is to be understood, however, other inorganic oxides besides alumina can be used and that the inorganic oxide can either be catalytically active or inactive with regard to the cracking reaction. Other suitable materials include silica-alumina, silica-magnesia, clays, etc.

The expression copper chromite as used throughout the specification and the claims is intended to define a well known class of compounds whose formula is usually designated $XCuO \cdot Cr_2O_3$, wherein X is a value of from 0.5 to 2.5. This material is well known in the art and is disclosed in various U.S. Pat. Nos., such as 3,767,595; 3,374,184; and 3,899,446; including the articles and patents mentioned therein.

The following examples will illustrate the novel process of this invention.

EXAMPLE 1

Copper chromite extrudates containing about 18.6 weight percent copper chromite, balance alumina (9.3 weight percent copper as copper oxide and 9.3 weight percent chromium as $Cr_2O_3$) were calcined for three hours in air at 1400° F. and ground to a fluid size range material, i.e. +40 microns minus 105 microns. The copper chromite was then blended with commercial fluid cracking catalyst Super D, manufactured by the Davidson Chemical Division of W. R. Grace & Company, comprising a 16% rare earth exchanged Y, balance a clay matrix. The commercial fluid cracking catalyst analyzed as follows:

Silica: 61 weight percent
Alumina: 29.9 weight percent
Sodium: 0.59 weight percent
$Re_2O_3$: 3.04 weight percent The commercial fluid cracking catalyst was steamed for four hours at 1400° F. with 100% steam at 0 psig prior to the addition of the copper chromite. The copper chromite was added in sufficient quantities to give two catalysts, one containing 100 ppm copper chromite and the other 1000 ppm of copper chromite. The copper chromite catalyst, together with a blank containing only the commercial cracking catalyst were evaluated for both their catalytic cracking activity and selectivity by using them to crack a wide cut mid-continent gas oil at an initial temperature of 935° F., a catalyst-to-oil ratio of 3 and at 8.33 weight hourly space velocity.

Following the above cracking test, the catalysts were then evaluated for their CO oxidation activity in accordance with the following procedure.

The coked catalyst from the cracking runs was blended with clean burnt catalyst of the same type to 0.65 weight percent coke on catalyst and regenerated at 1215° F. with air at a flow rate of 215 cc per minute. The combustion gases are continuously monitored and an overall carbon dioxide to carbon monoxide ratio is calculated. Additionally, a simulated flue gas containing carbon monoxide, carbon dioxide and excess oxygen was passed over the above at a flow rate of 215 cc per minute and CO conversion is determined.

The results of the cracking tests and the CO oxidation tests are shown below:

TABLE I

Effect of Copper Chromite Addition to Cracking Catalyst

| Copper Chromite | 0 | +100 ppm | +1000 ppm |
|---|---|---|---|
| Cat/Oil | 3.00 | 2.99 | 3.00 |
| WHSV | 8.33 | 8.35 | 8.33 |
| Reaction Temp, °F. | 922 | 921 | 921 |
| Conversion, % Vol. | 79.9 | 79.7 | 79.3 |
| $C_{5+}$ Gasoline, % Vol. | 61.1 | 60.2 | 60.1 |
| Total $C_4$, % Vol. | 18.5 | 19.3 | 19.8 |
| Dry Gas, % Wt. | 9.6 | 9.6 | 9.0 |
| Coke, % Wt. | 4.74 | 4.60 | 4.72 |
| C-on-Cat, Final, % Wt. | 1.33 | 1.32 | 1.34 |
| N—$C_5$, % Vol. | 1.1 | 1.0 | 0.8 |
| I—$C_5$, % Vol. | 10.1 | 9.7 | 9.8 |
| $C_5=$, % Vol. | 2.6 | 2.3 | 2.1 |
| N—$C_4$, % Vol. | 2.8 | 2.8 | 2.8 |
| I—$C_4$, % Vol. | 10.4 | 10.9 | 11.1 |
| $C_4=$, % Vol. | 5.4 | 5.7 | 5.8 |
| $C_3$, % Vol. | 4.9 | 4.9 | 4.5 |
| $C_3=$, % Vol. | 7.9 | 8.0 | 7.2 |
| $C_2$, % Wt. | 0.6 | 0.6 | 0.6 |
| $C_2=$, % Wt. | 0.7 | 0.7 | 0.7 |
| $C_1$, % Wt. | 0.5 | 0.5 | 0.5 |
| $H_2$, % Wt. | 0.05 | 0.06 | 0.08 |
| $H_2S$, % Wt. | 0.17 | 0.20 | 0.21 |
| Hydrogen Factor | 35 | 39 | 53 |
| Recovery, % Wt. | 93.8 | 95.3 | 94.9 |
| Alkylate, % Vol. | 22.1 | 22.6 | 21.6 |
| $C_{5+}$ Gasoline + Alkylate, % Vol. | 83.2 | 82.8 | 81.7 |
| Outside I—$C_4$, % Vol. | 4.9 | 4.7 | 3.8 |
| RON + 0, Raw Gaso. | 88.1 | 88.4 | 88.1 |
| MON + 0, Raw Gaso. | 0.0 | 79.6 | 0.0 |
| RON + 0, $C_{5+}$ Gaso. | 87.5 | 87.9 | 87.8 |
| RON + 0, $C_{5+}$ Gaso. + Alkylate | 89.2 | 89.5 | 89.4 |

Reference to Table I will show that the addition of the copper chromite at both 100 and 1000 ppm did not substantially affect the conversion and only decreased the $C_{5+}$ gasoline make by about 1 volume percent.

Please note, however, that the hydrogen factor went from only 35 without any copper chromite to 39 with 100 ppm of copper chromite. However, the addition of 1000 ppm of copper chromite resulted in a hydrogen factor of 53—a commercially unacceptable level.

The CO oxidation results, i.e. Table II, show that at 100 ppm, copper chromite substantially affected the percent of carbon monoxide converted, i.e. from 10% without any copper chromite to 93% with only 100 ppm of copper chromite.

TABLE II

CO Oxidation Activity of Copper Chromite Containing Catalyst

| Catalyst | $CO_2/CO$ | % CO Conversion |
|---|---|---|
| Super D | 0.8 | 10 |
| Super D + 100 ppm $CuCr_2O_7$ | 67 | 93 |
| Super D + 1000 ppm $CuCr_2O_7$ | 59 | 98 |

The following examples will show that extremely small amounts of copper chromite are effective to control CO emission. Comparisons are made between a commercial cracking catalyst having no added oxidation promoter and the same commercial catalyst with about 3.3 parts per million of platinum and with 10 parts per million of copper chromite.

EXAMPLE 2

A commercial aluminosilicate zeolite catalyst used in cracking a hydrocarbon charge in a TCC cracking operation is mixed with alumina beads containing 0.22 weight percent platinum at 0.15% by weight of total catalyst (3.3 ppm platinum) and the mixture is passed through a conventional regenerator used for TCC catalyst regeneration. As a comparison, the same used zeolite catalyst is also mixed with alumina containing 0.5 weight percent copper chromite at concentration of 0.2% by weight (10 ppm copper chromite).

Evaluation of Oxidizing Pellets in Regeneration

Both the platinum and the copper chromite are evaluated in the following regeneration process: In a regenerator kiln, air is passed therein in two streams, both from the center side with 16,500 c.f.m. directed upwardly and 14,280 c.f.m. directed downwardly. The catalyst is passed down from the top at a rate of 670 tons per hour and it contains about 0.649% by weight of carbon (average). The air temperature is 540° F. at each inlet; the outlet temperature is 885° F. The cross-sectional area of the kiln is 463 sq. ft. The gas outlets are located at the top of the kiln, just below the plenum area, and at the bottom of the kiln column.

The results are shown in the following table:

TABLE

| Type of Pellet | Position of Outlets | CO | $O_2$ | $CO_2$ | % CO Decrease |
|---|---|---|---|---|---|
| None | Top | 8.79 | 0.80 | 0.80 | — |
| | Bottom | 5.06 | 7.85 | 8.66 | — |
| Copper Chromite | Top | 6.46 | 0.15 | 10.12 | 26.5 |
| | Bottom | 3.19 | 6.20 | 11.20 | 37.0 |
| Platinum | Top | 4.74 | 0.03 | 11.2 | 46.1 |
| | Bottom | 1.24 | 4.32 | 13.9 | 75.4 |

The above clearly demonstrates the effectiveness of extremely low amounts of copper chromite, i.e. 10 ppm, in oxidizing carbon monoxide.

What is claimed is:

1. In a process for the catalytic cracking of gas oil to produce products boiling in the motor fuel range, wherein said gas oil is contacted with a porous acidic solid catalyst in a cracking vessel at conversion conditions including elevated temperatures and the absence of added hydrogen so as to convert said gas oil to lower molecular weight products with deposit on said catalyst of a deactivating solid carbonaceous contaminant resulting from said cracking, the so deactivated catalyst being transferred to a regeneration vessel in which oxidation of said carbonaceous deposit proceeds in the presence of air with generation of carbon monoxide and carbon dioxide and the regenerated catalyst at elevated temperature is transferred from said regeneration vessel to said cracking vessel to catalyze further cracking and supply at least part of the heat of reaction required by said cracking, the improvement which comprises:

conducting said cracking and said regeneration with an inventory of solid, porous, acidic cracking catalyst particles and particles of a copper chromite oxidation catalyst in admixture with alumina and limiting the concentration of said oxidation catalyst to an amount great enough to promote oxidation of CO and inadequate to substantially increase the generation of coke and hydrogen in said reaction vessel as compared with a like catalyst free of such metal, said amount being less than 500 ppm based on total catalyst inventory.

2. The process of claim 1, wherein said solid porous acidic cracking catalyst comprises a crystalline aluminosilicate zeolite having a pore size greater than 6 Angstrom units.

3. The process of claim 1, wherein copper chromite is present in an amount ranging from 50–150 ppm.

* * * * *